No. 790,107. PATENTED MAY 16, 1905.
J. H. CLARK.
TROLLEY.
APPLICATION FILED MAR. 3, 1905.
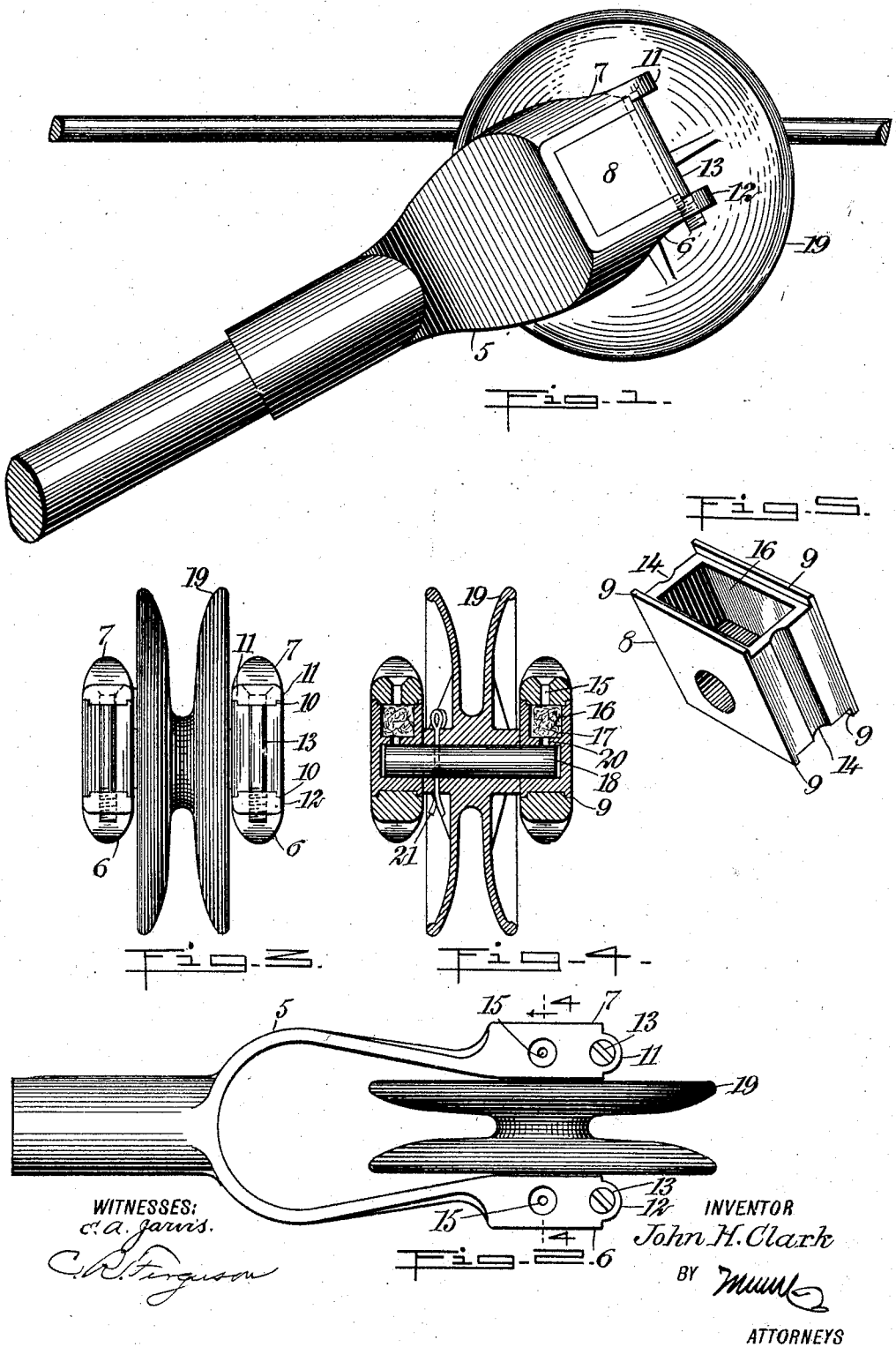
WITNESSES:
INVENTOR
John H. Clark
BY
ATTORNEYS No. 790,107. Patented May 16, 1905.

UNITED STATES PATENT OFFICE.

JOHN H. CLARK, OF URICHSVILLE, OHIO.

TROLLEY.

SPECIFICATION forming part of Letters Patent No. 790,107, dated May 16, 1905.

Application filed March 3, 1905. Serial No. 248,247.

*To all whom it may concern:*

Be it known that I, JOHN H. CLARK, a citizen of the United States, and a resident of Urichsville, in the county of Tuscarawas and State of Ohio, have invented a new and Improved Trolley, of which the following is a full, clear, and exact description.

This invention relates to improvements in trolleys for electric-railway systems, the object being to provide a harp and combined oil and bearing boxes for the trolley-spindle so constructed that the boxes can be readily reversed from one harp member to the other to compensate for wear, and when the bearings in the boxes are worn out new boxes may be placed in the harp.

Other objects of the invention will appear in the general description.

I will describe a trolley embodying my invention and then point out the novel features in the appended claims.

Reference is to be had to the accompanying drawings, forming a part of this specification, in which similar characters of reference indicate corresponding parts in all the figures.

Figure 1 is a side view of a trolley and harp embodying my invention. Fig. 2 is a top plan thereof. Fig. 3 is a rear view. Fig. 4 is a section on the line 4 4 of Fig. 2, and Fig. 5 is a perspective view of one of the combined oil and bearing boxes.

Referring to the drawings, 5 designates the trolley-harp, the opposite members of which are bifurcated, forming arms 6 7, between which the oil and bearing boxes 8 are removably placed. These boxes at the upper and lower edges have flanges 9 for engaging in channels 10, formed in said arms. The upper ends of the arms are provided with lugs 11 12, one lug of each arm having a screw-threaded perforation to receive the thread of a fastening screw or bolt 13, which passes through said lugs. The bolt 13 also engages in channels 14, formed in the upper and lower sides of the boxes. The upper arm of each harp member is provided with an oil-hole 15, which communicates with a chamber 16, formed in the upper portion of the box, and in which waste 17 for holding oil or other lubricant is designed to be placed. The lower wall of the chamber 16 communicates with the spindle 18 of the trolley 19 through a perforation 20.

In the drawings the spindle 18 is shown as secured to the trolley by means of a cotter 21; but a set-screw may be employed. It is to be understood, however, that the spindle may be cast integral with the trolley and, further, that cotters or the like may be substituted for the bolts 13.

Having thus described my invention, I claim as new and desire to secure by Letters Patent—

1. In a trolley, a harp, and combined oil and bearing boxes removably engaged in the harp members.

2. In a trolley, a harp, the opposite members thereof being bifurcated, combined oil and bearing boxes removably engaging in said bifurcated portions, each box having a chamber for waste, the bottom wall of which is provided with a perforation, and a trolley having its spindle-bearings in said boxes.

3. In a trolley, a harp, the opposite members of which are bifurcated to form oppositely-extended arms, perforated lugs on said arms, the perforation of one lug being screw-threaded, combined oil and bearing boxes for removably engaging between said arms, screws engaging through said lugs and against the upper sides of the boxes, and a trolley having its spindle-bearings in said boxes.

In testimony whereof I have signed my name to this specification in the presence of two subscribing witnesses.

JOHN H. CLARK.

Witnesses:
J. LESLIE HILLYER,
D. J. THOMPSON.